United States Patent
Jiang et al.

(10) Patent No.: US 10,574,382 B2
(45) Date of Patent: Feb. 25, 2020

(54) LOW COST INTENSITY-MODULATED DIRECT-DETECTION (IMDD) OPTICAL TRANSMITTER AND RECEIVER

(71) Applicant: Huawei Technologies Co., Ltd., Shenzhen (CN)

(72) Inventors: Zhiping Jiang, Kanata (CA); Xuefeng Tang, Kanata (CA); Zhuhong Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/995,175

(22) Filed: Jun. 1, 2018

(65) Prior Publication Data

US 2019/0109667 A1  Apr. 11, 2019

Related U.S. Application Data

(60) Provisional application No. 62/569,402, filed on Oct. 6, 2017.

(51) Int. Cl.
| | |
|---|---|
| H04J 14/02 | (2006.01) |
| H04B 10/516 | (2013.01) |
| H04B 10/50 | (2013.01) |
| H04B 10/077 | (2013.01) |
| H04B 10/572 | (2013.01) |
| H04B 10/54 | (2013.01) |
| H04B 10/548 | (2013.01) |
| H04B 10/67 | (2013.01) |
| H04B 10/40 | (2013.01) |
| H04B 10/60 | (2013.01) |

(52) U.S. Cl.
CPC ...... *H04J 14/0276* (2013.01); *H04B 10/0775* (2013.01); *H04B 10/506* (2013.01); *H04B 10/5165* (2013.01); *H04B 10/54* (2013.01); *H04B 10/572* (2013.01); *H04B 10/675* (2013.01); *H04J 14/0256* (2013.01); *H04J 14/0265* (2013.01); *H04B 10/40* (2013.01); *H04B 10/50* (2013.01); *H04B 10/548* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 5,227,908 | A * | 7/1993 | Henmi | H04B 10/25137 372/26 |
| 6,850,713 | B2 * | 2/2005 | Kikuchi | H04B 10/505 359/237 |
| 2008/0232823 | A1 * | 9/2008 | Jansen | H04B 10/505 398/204 |

(Continued)

FOREIGN PATENT DOCUMENTS

| | | |
|---|---|---|
| CN | 101399618 A | 4/2009 |
| CN | 101692627 A | 4/2010 |

*Primary Examiner* — Darren E Wolf
(74) *Attorney, Agent, or Firm* — Slater Matsil, LLP (57) ABSTRACT

An embodiment method includes multiplexing light emitted by the plurality of optical transmitters to provide a multiplexed optical signal; propagating the multiplexed optical signal through an optical interleaver from a first port thereof to a combined port thereof and back to a second port thereof; and detecting an optical signal at the second port of the optical interleaver.

20 Claims, 11 Drawing Sheets

(56) References Cited

U.S. PATENT DOCUMENTS

| | | |
|---|---|---|
| 2010/0021166 A1* | 1/2010 | Way .................. H04J 14/02 398/79 |
| 2010/0092183 A1 | 4/2010 | Kim et al. |
| 2010/0142955 A1 | 6/2010 | Yu et al. |
| 2017/0250758 A1* | 8/2017 | Kikuchi ............. H04B 10/2513 |
| 2017/0264368 A1* | 9/2017 | Eiselt .................. H04B 10/516 |

* cited by examiner

LOW COST INTENSITY-MODULATED DIRECT-DETECTION (IMDD) OPTICAL TRANSMITTER AND RECEIVER

This application claims the benefit of U.S. Provisional Application No. 62/569,402 filed on Oct. 6, 2017 by Zhiping Jiang et al. and entitled "Low Cost Intensity-Modulated Direct-Detection (IMDD) Optical Transmitter And Receiver," which is hereby incorporated herein by reference as if reproduced in its entirety.

TECHNICAL FIELD

The present disclosure relates generally to a system and method for optical data transmission and, in particular embodiments, to a low cost intensity-modulated direct-detection (IMDD) transceiver.

BACKGROUND

A demand exists for data transmissions at a rate of 50 gigabits per second (Gbps) or more over distances greater than 10 kilometers (km). Several optical data transmission techniques have been proposed for meeting this demand, but each has drawbacks. 10 gigabit per second on/off keying (10 G OOK) meets the optical dispersion requirement, but the data rate under this technique might be too low. Coherent transmission can provide a high capacity but might be too expensive. 50 Gbps OOK/PAM4 (4-level pulse amplitude modulation) without dispersion pre-compensation might not provide enough dispersion tolerance. 50 Gbps OOK/PAM4 with dispersion pre-compensation might be too expensive and might require an external IQ modulator (where "I" is the "in-phase" component of a waveform, and "Q" represents a quadrature component). A non-coherent system has the advantages of low cost, small footprint and low power consumption but has the drawback of low dispersion tolerance. In a high-speed, long-distance data transmission scenario, one problem is dispersion, wherein spectral side bands of different carrier frequencies destructively interfere with one another. For example, for a 50 Gbps or more transmission, the propagation distance is currently limited to a few kilometers over the most popular non-dispersion shifted single mode fiber (G.652) because of dispersion.

SUMMARY

In accordance with an embodiment of the present disclosure, an optical transmitter module comprises a plurality of transmitters each for transmitting a modulated optical signal having a different center wavelength and a pair of side bands; a multiplexor operably coupled to the plurality of transmitters to multiplex individual modulated optical signals into a multiplexed optical signal; and a periodic optical filter configured to receive the multiplexed optical signal and to suppress one side band in each modulated signal of the multiplexed optical signal such that a single side band remains in each modulated signal of the multiplexed optical signal.

In accordance with another embodiment of the present disclosure, a method for controlling emission wavelength of a plurality of optical transmitters comprises multiplexing light emitted by the plurality of optical transmitters to provide a multiplexed optical signal; propagating the multiplexed optical signal through an optical interleaver from a first port thereof to a combined port thereof and back to a second port thereof; and detecting an optical signal at the second port of the optical interleaver.

An advantage of an embodiment of the present disclosure is that dispersion tolerance is increased through the use of a single periodic optical filter on a combined signal that is a combination of signals transmitted by a plurality of transmitters each transmitting at a different wavelength.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure, manufacture and use of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Embodiments of the present disclosure provide a low cost solution to problems inherent in optical transmission systems, especially in high-speed, long-distance data transmissions. As mentioned above, non-coherent systems have the advantages of low cost, small footprint and low power consumption but have the drawback of low dispersion tolerance. The embodiments use single side band transmissions to greatly increase dispersion tolerance in non-coherent systems. The embodiments further use a single periodic optical filter on multiple combined data channels to generate a single side band for multiple wavelengths. That is, a multi-channel single side band is achieved with one periodic optical filter. The single periodic optical filter can be used as both a single side band signal filter and a wave locker. The same filter can be used to control the wavelength or to measure a deviation of the wavelength from a nominal value, e.g., an International Telecommunication Union Telecommunication Standardization Sector (ITU-T)-defined grid.

Figure 1:
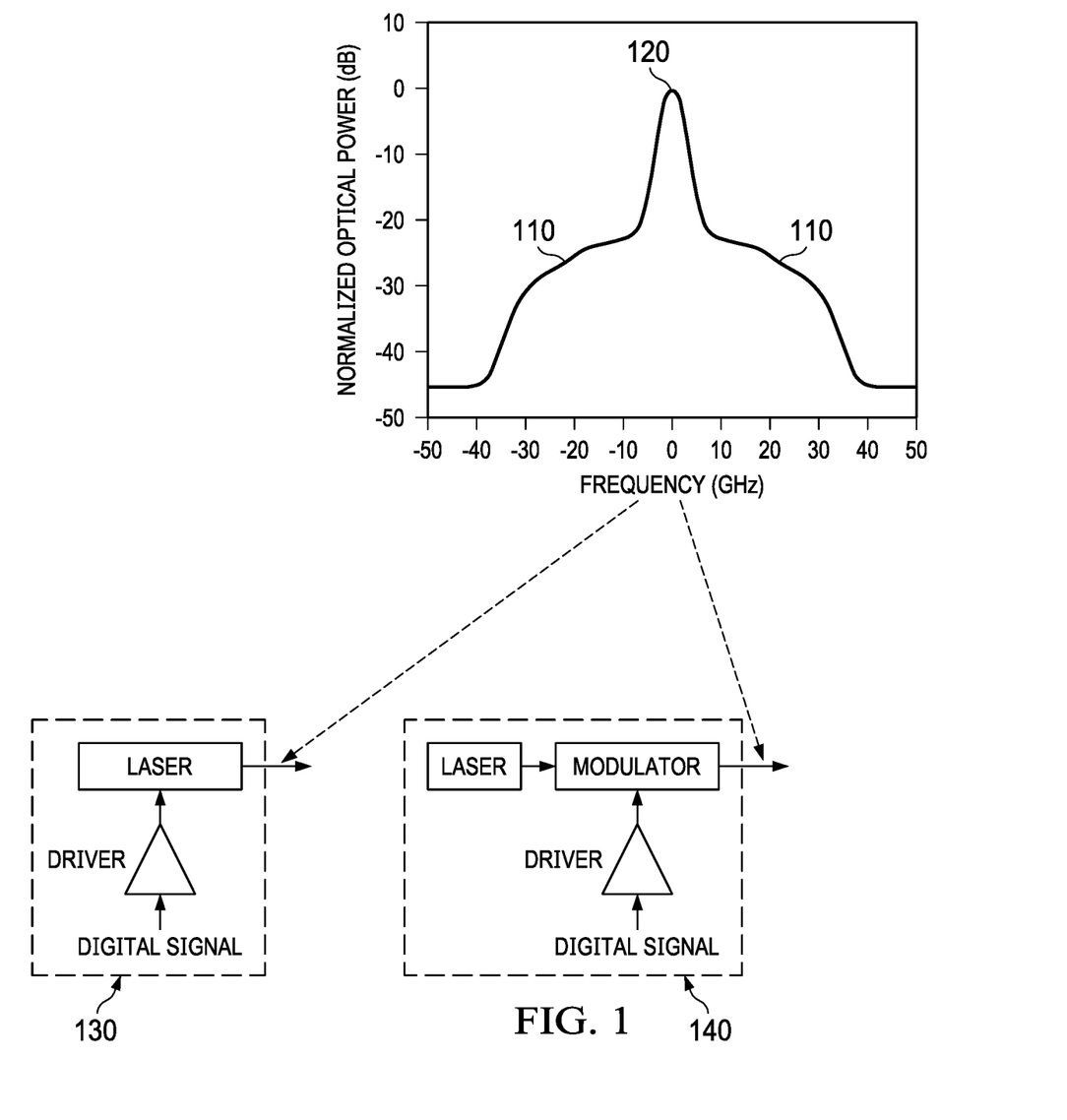
FIG. 1 is a spectral plot of a conventional transmission with a double side band, superimposed with a schematic of a transmitter.

FIG. 1 illustrates a conventional transmission with a double side band. It can be seen that there are spectral side bands 110 on both sides of a carrier frequency 120. Because of dispersion in an optical fiber, the side bands 110 of carrier's 120 travel at slightly different velocities and as a result accumulate phase shifts which destroy coherence between the side bands, causing inter-symbol mixing and other undesirable effects. Such a double side band transmission might be generated by a laser directly modulated by an electrical signal, as shown at element 130, or by a laser with an external intensity modulator, as shown at element 140.

Figure 2:
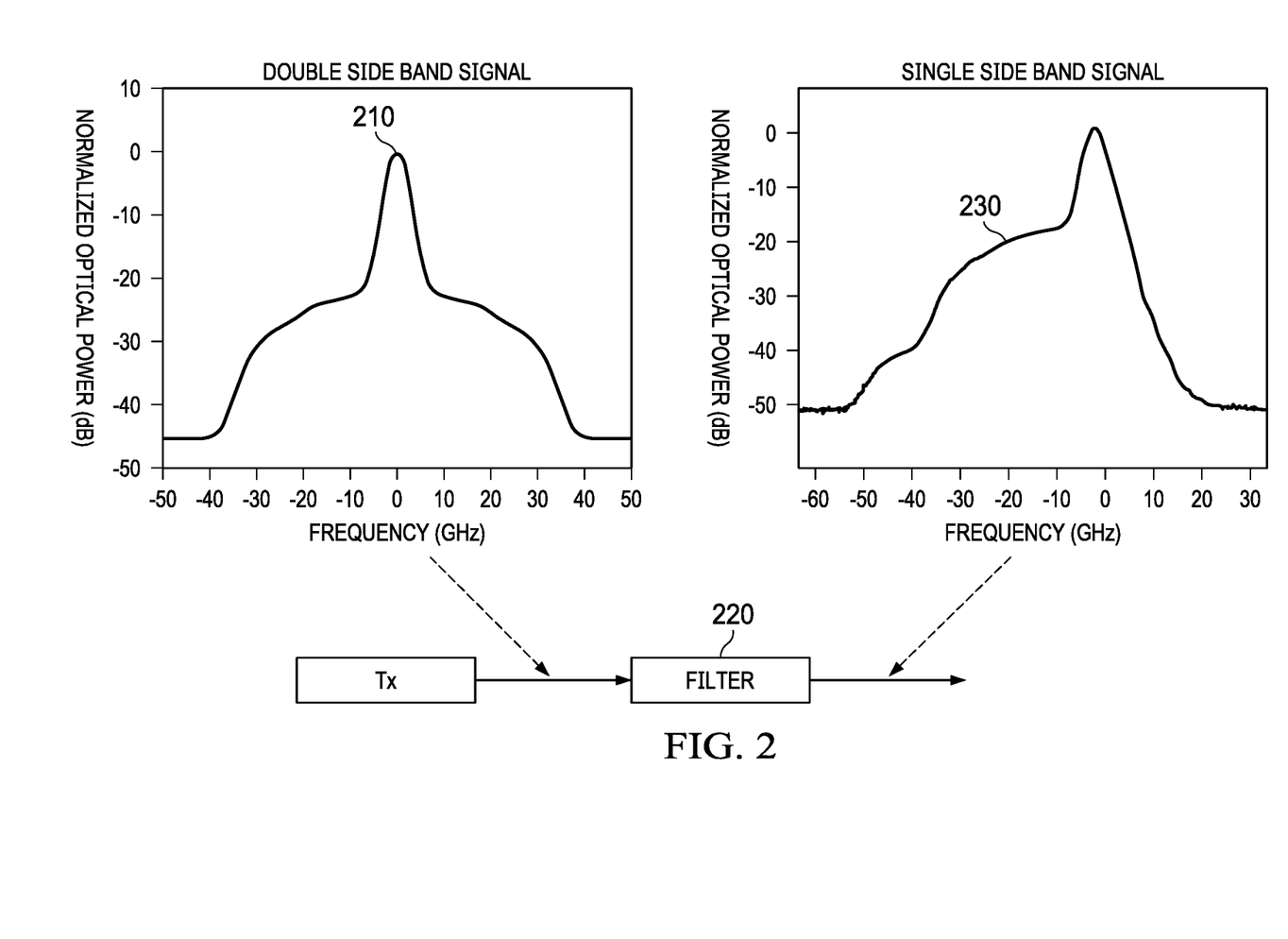
FIG. 2 is a spectral plot of a double side band transmission and spectral plot of a single side band transmission.

Single side band transmission is a technique for optical data transmission that decreases the impairment of dispersion by suppressing one of the side bands of a double side band transmission. FIG. 2 illustrates the generation of a single side band transmission. A double side band transmission 210 is passed through a filter 220, such as an optical filter, to effectively eliminate the side band on the right side of the double side band transmission 210 and generate a single side band transmission 230. Tolerance to dispersion is thereby enhanced. A proper offset typically needs to exist between the signal and the optical filter central frequencies. This offset might be achieved by shifting the signal, shifting the filter, or both.

Figure 3:
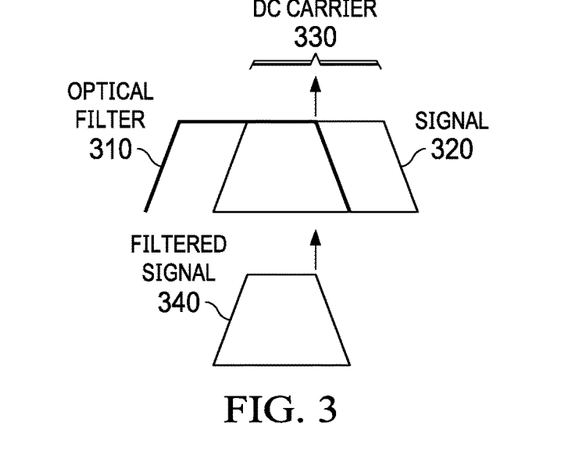
FIG. 3 is a diagram illustrating filtering of a double side band transmission to generate a single side band transmission.
Figure 4:
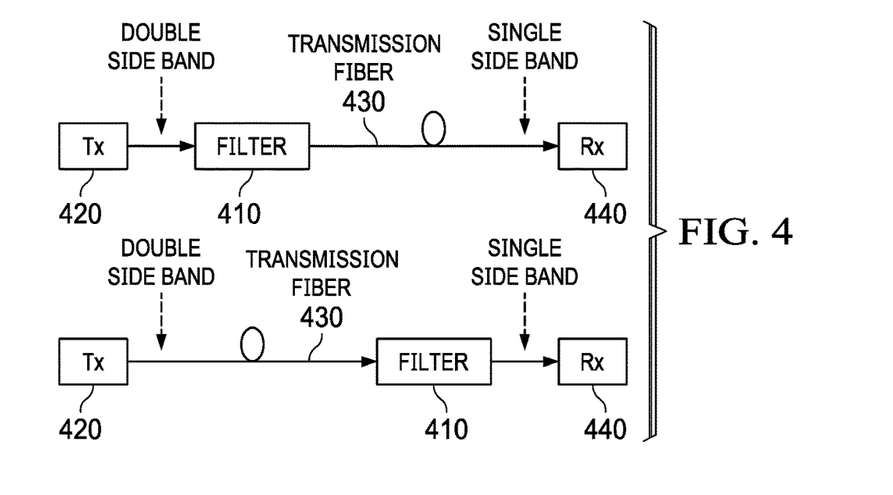
FIG. 4 is a schematic diagram illustrating the positioning of a filter with respect to a transmitter, a receiver and a transmission fiber.
Figure 5:
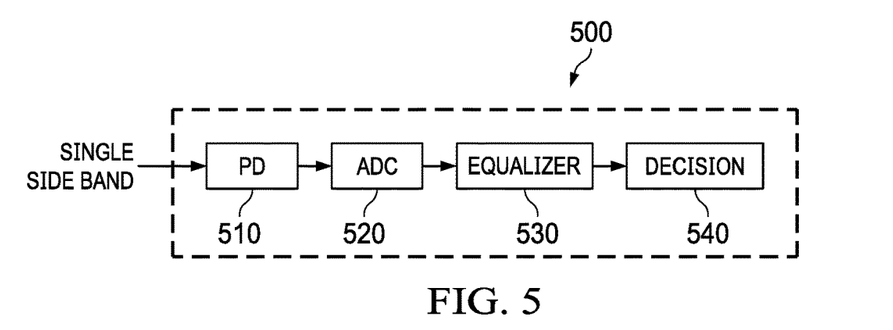
FIG. 5 is a schematic diagram illustrating components in a single side band receiver.

FIG. 3 illustrates such filtering. An optical filter 310 removes the right-hand portion 320 of a signal 330 to produce a filtered signal 340. FIG. 4 illustrates that such a filter 410 can be placed between a transmitter 420 and a transmission fiber 430 or between the transmission fiber 430 and a receiver 440. As shown in FIG. 5, a single side band receiver 500 typically includes a photodetector (PD) 510, an analog-to-digital converter (ADC) 520, an equalizer 530, and one or more decision blocks 540.

Figure 6:
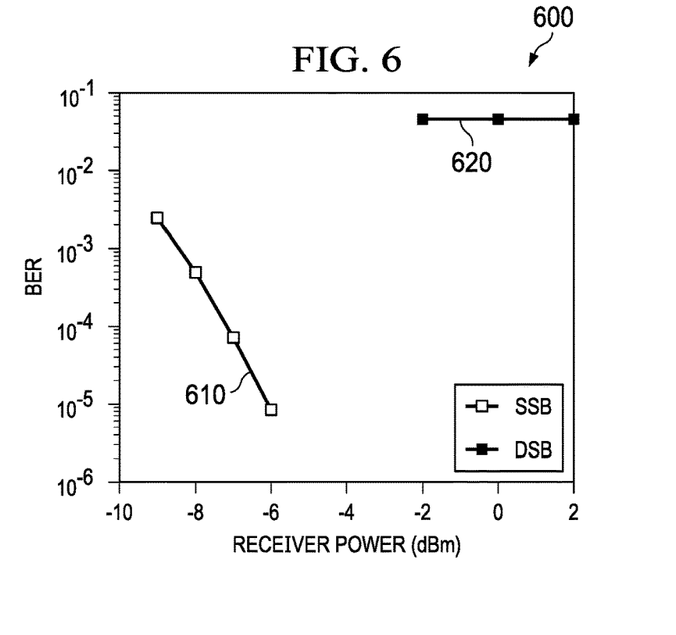
FIG. 6 is a graph illustrating an advantage of single side band transmission over double side band transmission.

FIG. 6 is a graph 600 illustrating an advantage of single side band transmission (SSB) 610 over double side band transmission (DSB) 620. In this test of propagation over an 18 km G652 fiber, a 21-tap time domain equalizer (TDEQ) (operating at two samples per symbol (SPS)) was used to equalize the dispersion. The use of single side band transmission alone improves tolerance to dispersion. The use of TDEQ further increases dispersion tolerance. That is, TDEQ effectively equalizes the dispersion distortion applied to the SSB signal 610. The SSB signal 610 was generated with a 24 gigahertz (GHz) frequency offset and was generated by tuning the laser frequency off from the filter center (ITU grid). It can be seen that the DSB transmission 620 fails due to dispersion.

Figure 7:
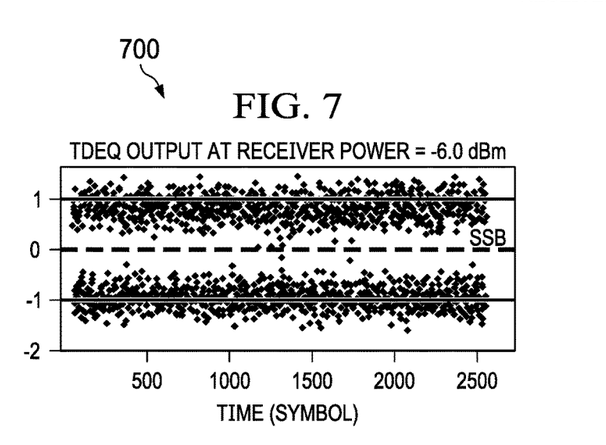
FIG. 7 is a graph illustrating a single side band transmission for on/off keying.
Figure 8:
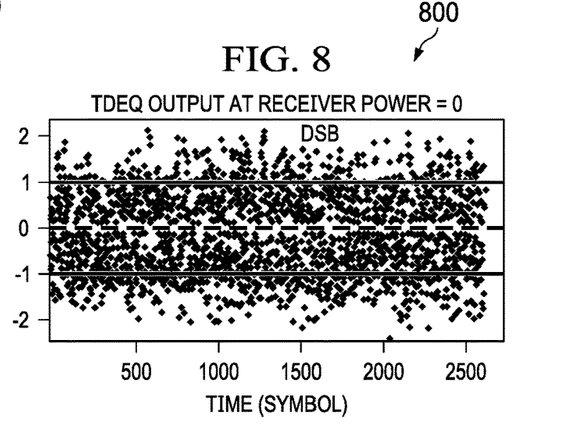
FIG. 8 is a graph illustrating a double side band transmission for on/off keying.

FIG. 7 and FIG. 8 further illustrate an advantage of single side band transmission over double side band transmission. FIG. 7 is a graph 700 illustrating a single side band transmission for on/off keying with a TDEQ output at a receiver power of −6.0 dBm (decibels referenced to one milliwatt). It can be seen that "on" and "off" are well separated in the single side band transmission. FIG. 8 is a graph 800 illustrating a double side band transmission for on/off keying with a TDEQ output at a receiver power of 0 dBm. It can be seen that "on" and "off" are not well separated in the double side band transmission.

Figure 9:
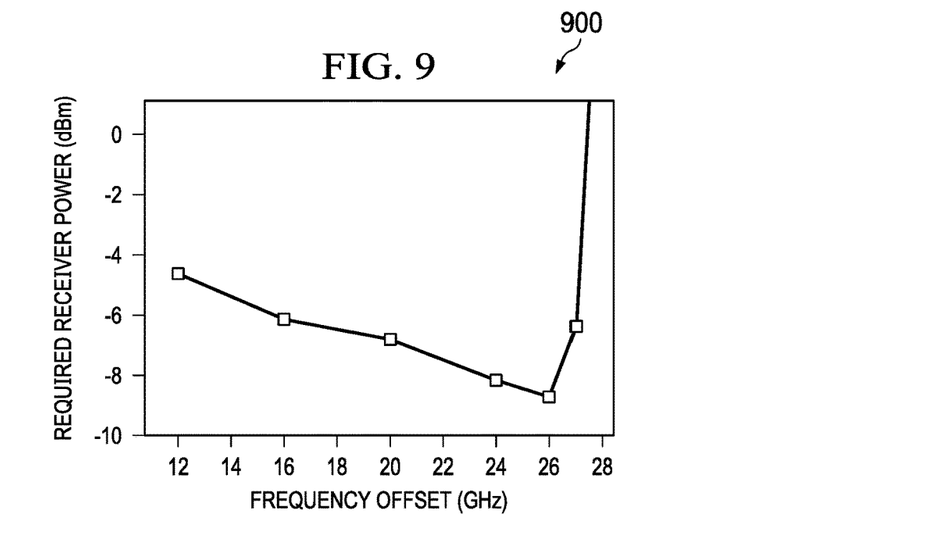
FIG. 9 is a graph illustrating frequency offset sensitivity.
Figure 10:
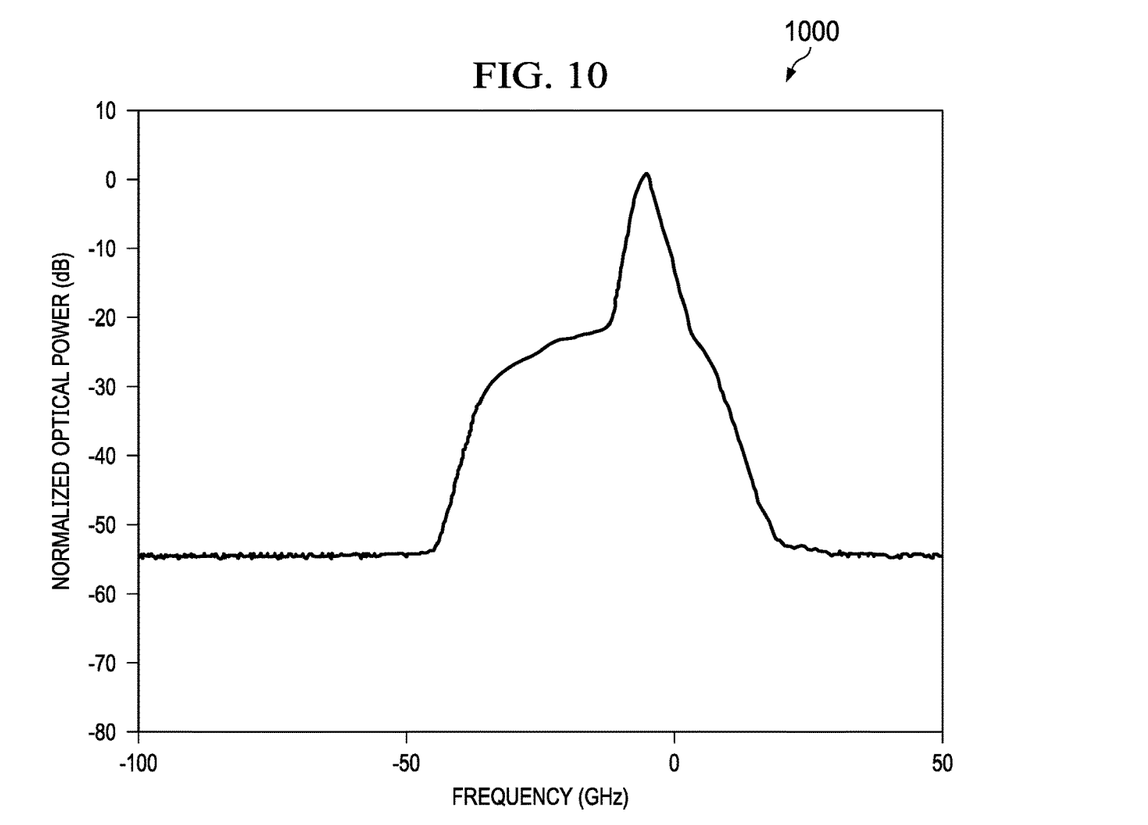
FIG. 10 is a graph illustrating normalized optical power vs. frequency for a 12 GHz offset.
Figure 11:
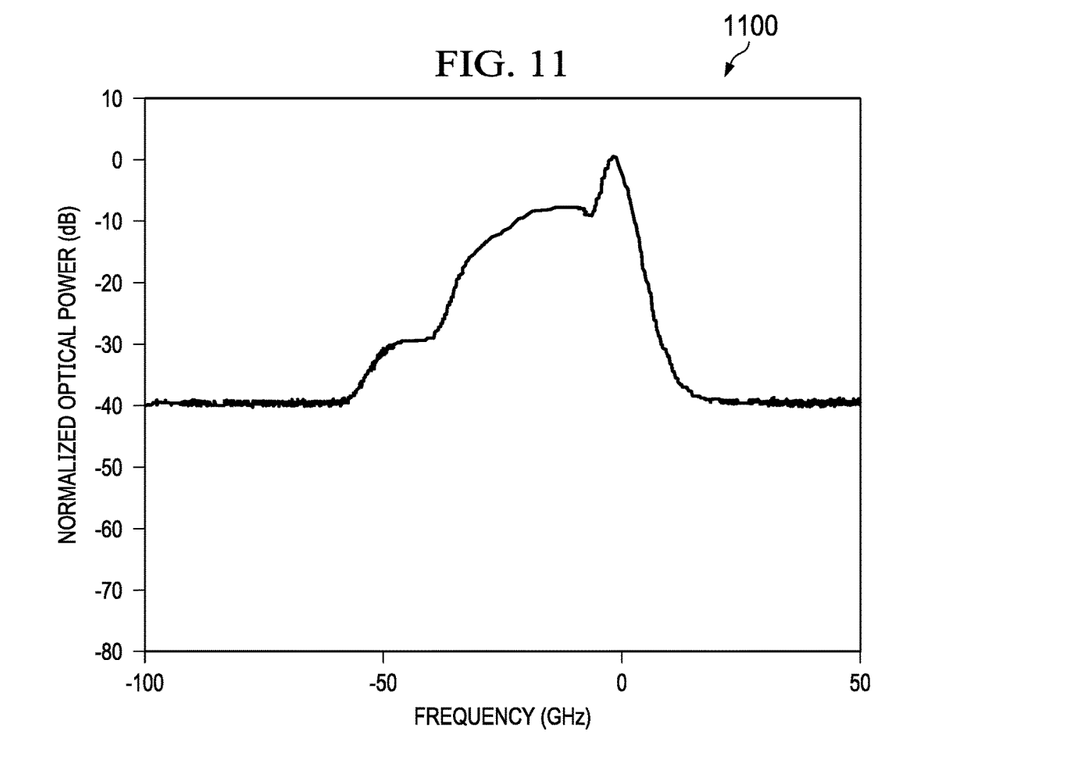
FIG. 11 is a graph illustrating normalized optical power vs. frequency for a 28 GHz offset.

Data transmission performance characteristics might be improved when the frequency offset is increased. That is, there might be some optimal frequency offset at which optimal signal transmission occurs. This performance improvement might be attributed to an increase of the reject ratio of the half spectral band. On the other hand, when the frequency offset is large, e.g. larger than 26 GHz, the suppression of the carrier and the strong filtering on the signal-side spectrum might start to degrade the dispersion compensation performance. The single side band transmission might operate with a wide frequency offset range (greater than 10 GHz if the receiver power is set to −5 dBm), which might make the laser frequency control more flexible. FIG. 9 is a graph 900 illustrating frequency offset sensitivity by showing a required receiver power at a 1e-3 bit error rate (BER) vs. frequency offset. FIG. 10 is a graph 1000 illustrating normalized optical power vs. frequency for a 12 GHz offset. FIG. 11 is a graph 1100 illustrating normalized optical power vs. frequency for a 28 GHz offset.

Figure 12:
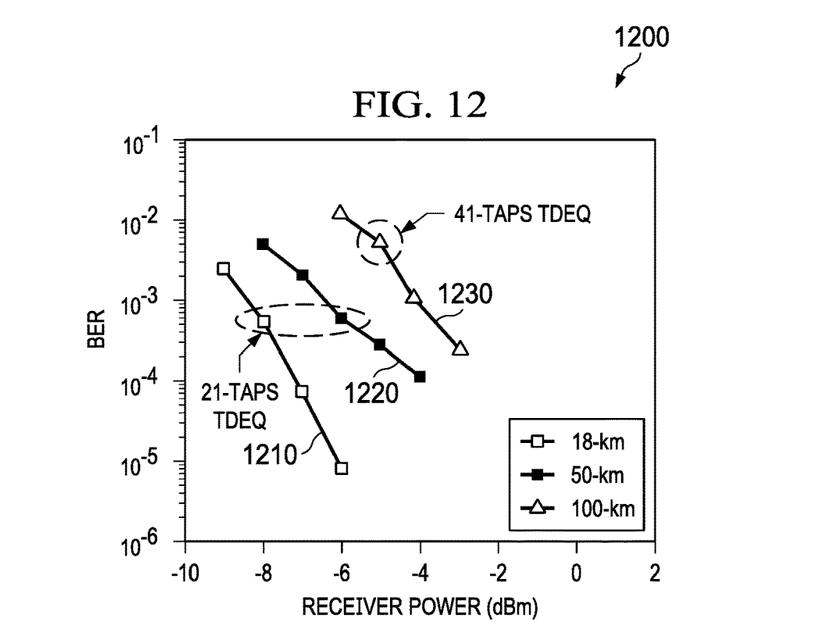
FIG. 12 is a graph illustrating BER vs. receiver power for various transmission distances over G.652 fiber.

FIG. 12 is a graph 1200 illustrating measured BER vs. receiver power for transmission distances of 18 km 1210, 50 km 1220, and 100 km 1230. In these tests, 21-tap TDEQ was used for the 18 km transmission 1210 and the 50 km transmission 1220, and 41-tap TDEQ was used for the 100 km transmission 1230. A 24 GHz frequency offset was used. The number of TDEQ taps was determined by the amount of dispersion that needed to be compensated. The performance might be optimized through DC to signal ratio, modulator bias and frequency offset. It can be seen that single side band transmissions might be able to propagate much longer distances than double side band transmissions and that the use of single side band transmission is therefore a viable option for high data rate, long distance data transmissions.

Figure 13:
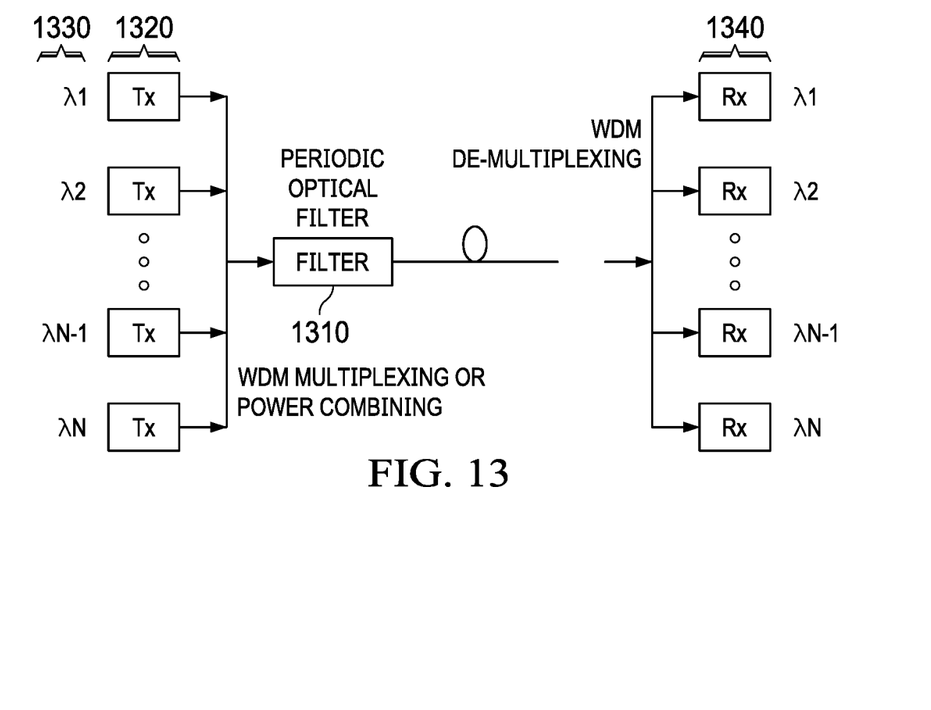
FIG. 13 is a schematic diagram of a transmission system comprising a periodic optical filter for combined transmissions of different wavelengths.

FIG. 13 illustrates an embodiment use of a periodic optical filter 1310 for combined transmissions of different wavelengths. A plurality of transmitters 1320 each transmits at a different center wavelength 1330. The transmitters 1320 might be an intensity modulated transmitter array containing directly modulated lasers (DML) or electro-absorption modulated lasers (EML), each at a particular wavelength. The wavelength of a transmitter might be shifted by approximately half wavelength spacing. The signals or the filters might be on an ITU-T grid, and one of them might be shifted by half channel spacing. The transmissions from the transmitters 1320 are combined by wavelength division multiplexing (WDM), power combining, or some other combining technique. The combined signals are then passed through the periodic optical filter 1310. The periodic optical filter 1310 might in general be a two-beam or a multi-beam optical interference device, and might in particular be a Fabry-Perot etalon, a multi-cavity etalon, a Mach-Zehnder interferometer, or some other two-beam or multi-beam interference device. After passing through the periodic optical filter 1310, the combined signals are de-multiplexed and sent to a plurality of receivers 1340. As shown in FIG. 5, each receiver 1340 can include a photodetector, an analog-to-digital converter, an equalizer, and one or more decision blocks. Optical amplification between the transmitters 1320 and receivers 1340 has been omitted from the drawing.

The use of the periodic optical filter 71310 on the combined signals from the transmitters 1320 allows filtering to be performed simultaneously on signals at different wavelengths. That is, the single periodic optical filter 1310 performs single side band suppression for each of the carrier wavelengths in the combined transmission from all of the transmitters 1320 and thereby removes approximately half of the spectrum from the signals transmitted by all the transmitters 1320.

In other words, an optical transmitter module might include a plurality of transmitters each for transmitting a modulated optical signal having a different center wavelength and a pair of side bands; a multiplexor operably coupled to the plurality of transmitters to multiplex individual modulated optical signals into a multiplexed optical signal; and a periodic optical filter configured to receive the multiplexed optical signal and to suppress one side band in each modulated signal of the multiplexed optical signal such that a single side band remains in each modulated signal of the multiplexed optical signal. The periodic optical filter might be an optical interleaver. In an embodiment, the interleaver might include a first port e.g. for a first wavelength channel group, a second port e.g. for a second wavelength channel group, and a combined port for the combined first and second charm& groups. It is understood that, since an interleaver is generally a bidirectional device, the first and second ports may function as input port, and the combined port may function as an output port, or vice versa. The multiplexor might be optically coupled to the first port. The optical transmitter module might further include a reflective element coupled to the combined port of the optical interleaver for reflecting a portion of light back to the first and second ports and a photodetector coupled to the second port of the optical interleaver for detecting light propagated back from the combined port to the second port.

Figure 14:
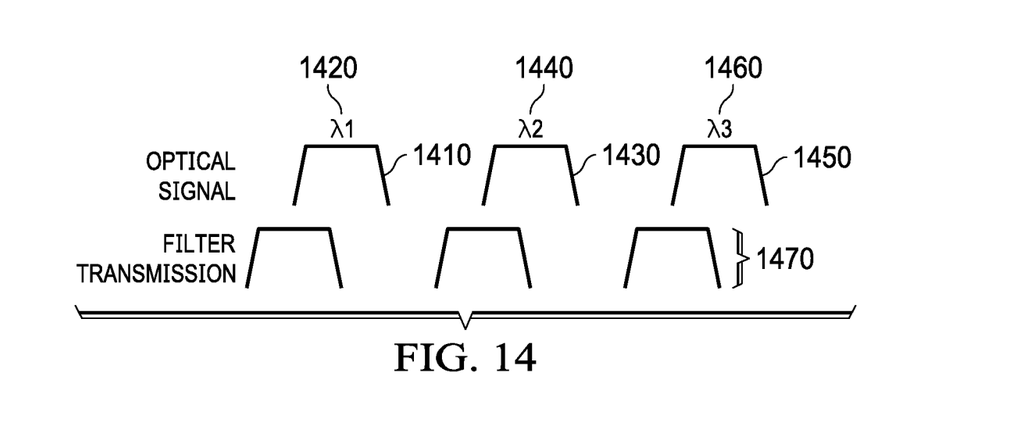
FIG. 14 is a schematic diagram illustrating filtering on signals of different wavelengths.

FIG. 14 illustrates the relative frequency offset between signals and filters. In a combined signal that includes signals from multiple transmitters, a first optical signal 1410 from a first transmitter has a first wavelength 1420, a second optical signal 1430 from a second transmitter has a second wavelength 1440, and a third optical signal 1450 from a third transmitter has a third wavelength 1460. The periodic optical filter 1310 is able to filter each of the optical signals 1410,1430, and 1450 at the respective wavelengths of each of the signals to create the output of the periodic optical filter 1310.

Figure 15:
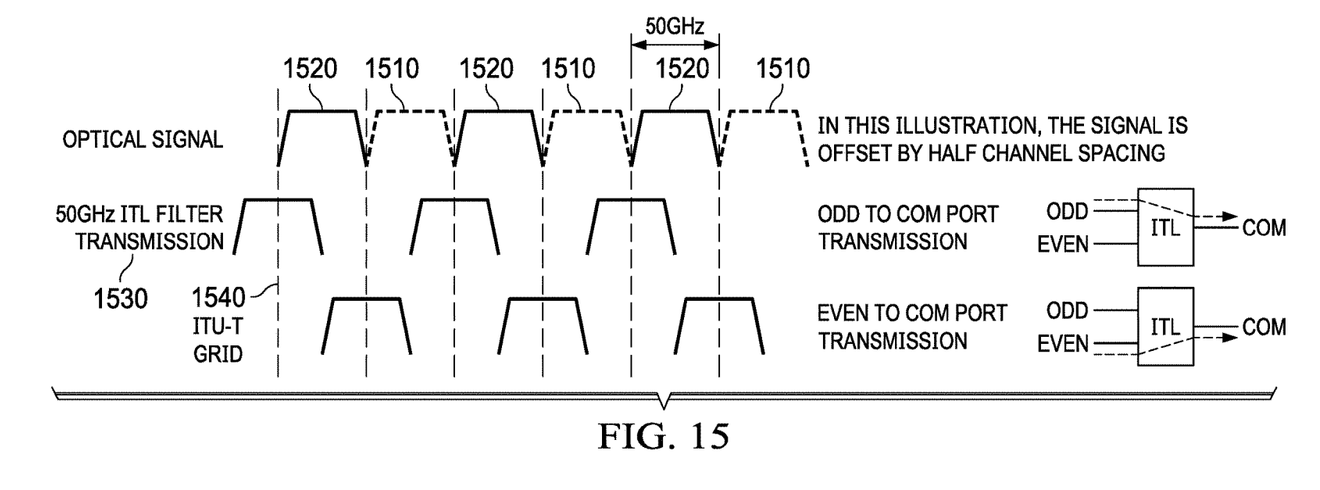
FIG. 15 is a schematic diagram illustrating a spectral offset for an optical signal propagating in an optical interleaver.

FIG. 15 illustrates an offset for an optical signal wavelength relatively to transmission wavelength of an optical interleaver, which is shown schematically on the right-hand side of FIG. 15. In this example, the spacing between channels is 50 GHz, but some other spacing could be used. In a 50 GHz spaced ITU-T grid the signals 1510 would be present, but in an embodiment alternating signals are not present, as described below, giving the remaining signals 1520 a spacing of 100 GHz. It is further noted that in this embodiment, the signals 1520 are shifted relative to the ITU grid 1540. The transmission bands 1530 from a periodic optical filter, in this case interleaver, are centered on an ITU-T grid 1540. The transmission bands 1530 are offset by exactly half channel spacing, i.e. 25 GHz. As will be explained in more detail below, in this case an output power of light propagated from the first port to the common port and then reflected to the second port is maximized when the signals 1520 are offset by a half channel spacing from the centers of the filter transmissions 1530.

Figure 16:
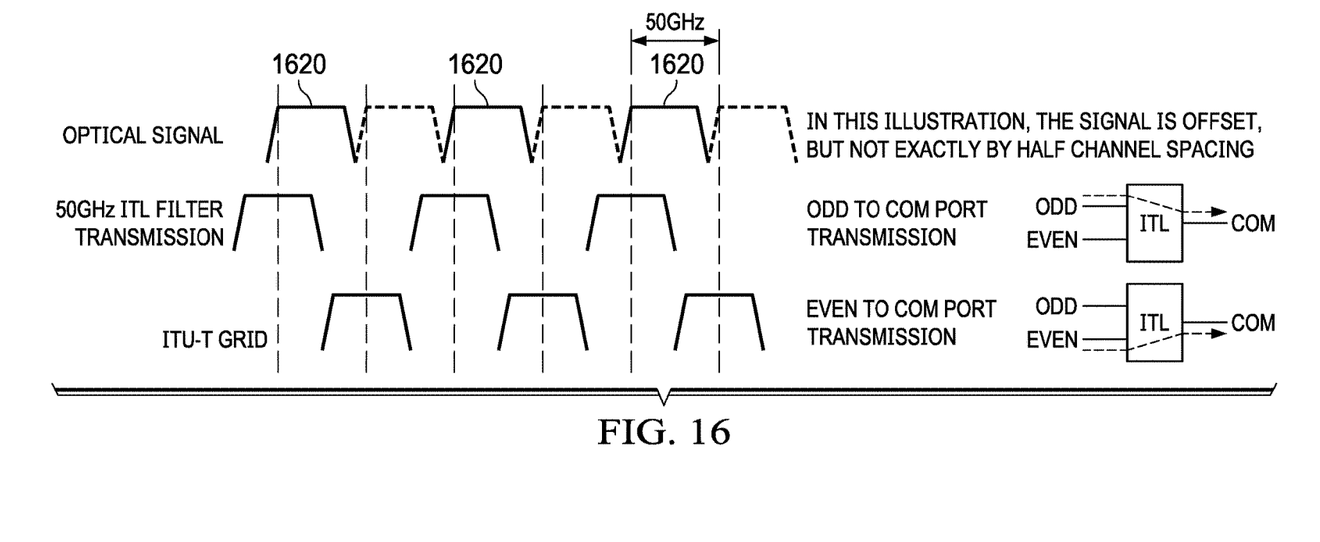
FIG. 16 is a schematic diagram illustrating another spectral offset for an optical signal propagating in the optical interleaver.

FIG. 16 illustrates another offset for an optical signal. In this case, the signals 1620 are offset, but not exactly by a half channel spacing, and thus output power is increased but not maximized, as now will be explained.

Figure 17:
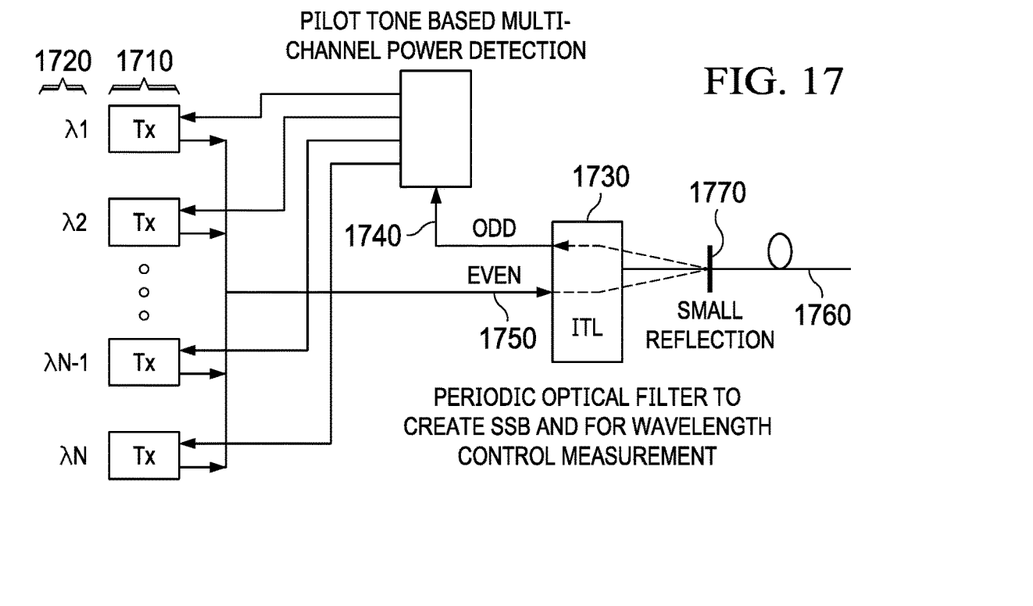
FIG. 17 is a schematic diagram illustrating a transmitter comprising a periodic optical filter for combined transmissions of different wavelengths.

FIG. 17 illustrates an embodiment use of a periodic optical filter for combined transmissions at different wavelengths. A plurality of transmitters 1710 each transmits at a different wavelength 1720. ITU-T has defined various spacings that might be used between the wavelengths of the transmitters 1710, such as 50 GHz, 100 GHz, or 200 GHz, with 50 GHz currently being the most popular. A unique pilot tone might be applied to each wavelength. The transmissions from the transmitters 1710 are combined, similarly to FIG. 13, to create a combined signal. A pilot tone may have relatively low frequency (kHz or MHz), and with small amplitude modulation on a high speed optical signal. In an embodiment, the combined signal includes signals only from alternating transmitters 1710. That is, the combined signal includes signals only from a first transmitter 1710, a third transmitter 1710, a fifth transmitter 1710, and so on, or the combined signal includes signals only from a second transmitter 1710, a fourth transmitter 1710, a sixth transmitter 1710, and so on. Thus, if the original wavelength spacing between the transmitters 1710 is 50 GHz, the wavelength spacing of the signals in the combined transmission will be 100 GHz.

The combined signal is sent to an interleaver 1730. The interleaver 1730 might be substantially similar to the periodic optical filter 1310 of FIG. 13 or a similar component.

The interleaver 1730 might include two input/output ports that can interface with the transmitters 1710 and that can be referred to as the odd port 1740 and the first port 1750. The interleaver 1730 might include also a port that can be referred to as a common port 1760 or a combined port 1760. In an embodiment, a reflector 1770 is coupled to the common port of the interleaver 1730 such that a portion of the signal arriving at the odd port 1740 of the interleaver 1730 appears at the first port 1750 of the interleaver 1730 and/or a portion of the signal arriving at the first port 1750 of the interleaver 1730 appears at the odd port 1740 of the interleaver 1730. The small reflection 1770 might be introduced at the interleaver 1730 by a well-known technique or may occur naturally at the interleaver 1730.

In an embodiment, the small reflection 1770 is used to control the wavelengths of the signals transmitted by the transmitters 1710. That is, a measurement can be made at one of the odd port 1740 or the first port 1750 of the reflected signal that is a portion of the combined signal that arrived at the other of the odd port 1740 or the first port 1750. When the strength of the reflected signal is a maximum, it can be assumed that the wavelengths of the signals in the combined signal have been optimized. That is, when the strength of the reflected signal is a maximum, it can be assumed that the signals in the combined signal have been offset by approximately half a channel spacing and that an optimal amount of suppression has thus been applied to the unwanted side bands of the signals in the combined signal.

Figure 18:
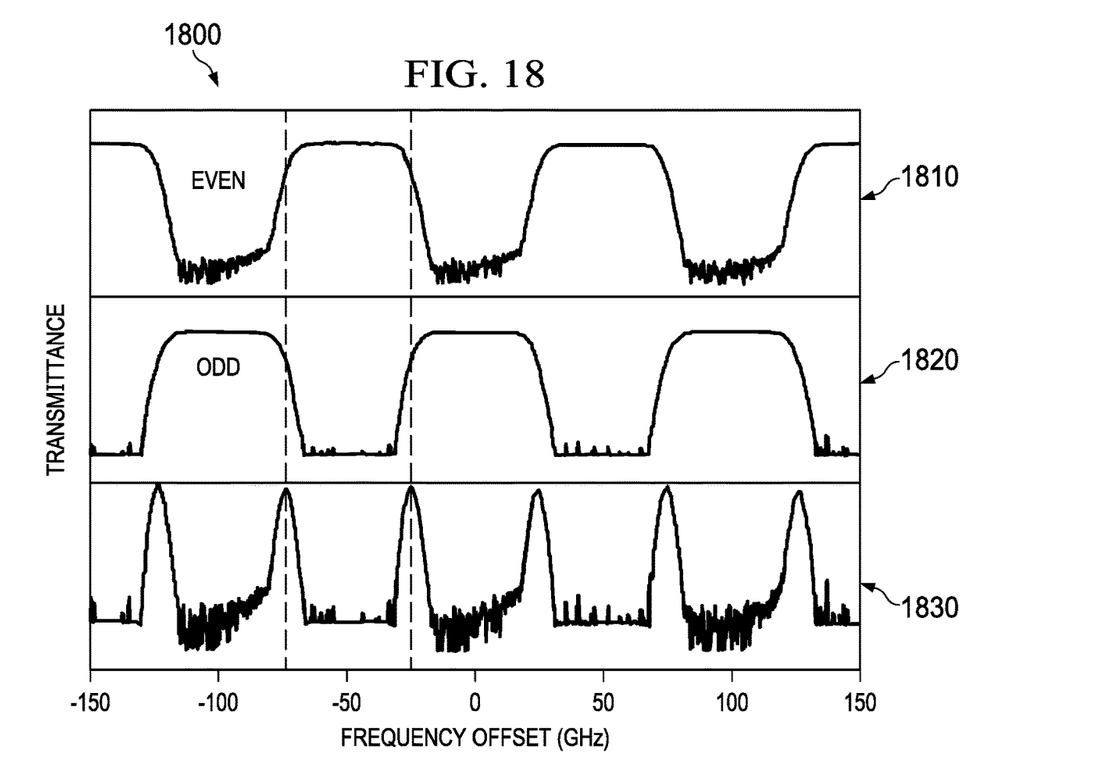
FIG. 18 is a spectral plot illustrating peaks that occur when signals are offset by half a channel spacing.

FIG. 18 is a graph 1800 illustrating the maximization of the reflected signal. Curve 1810 represents the transmission response from the first port 1750 to output port 1760, and curve 1820 represents the transmission response from the odd port 1740. Curve 1830 represents the frequency response for the reflected path from the first port to the second port.

Figure 19:
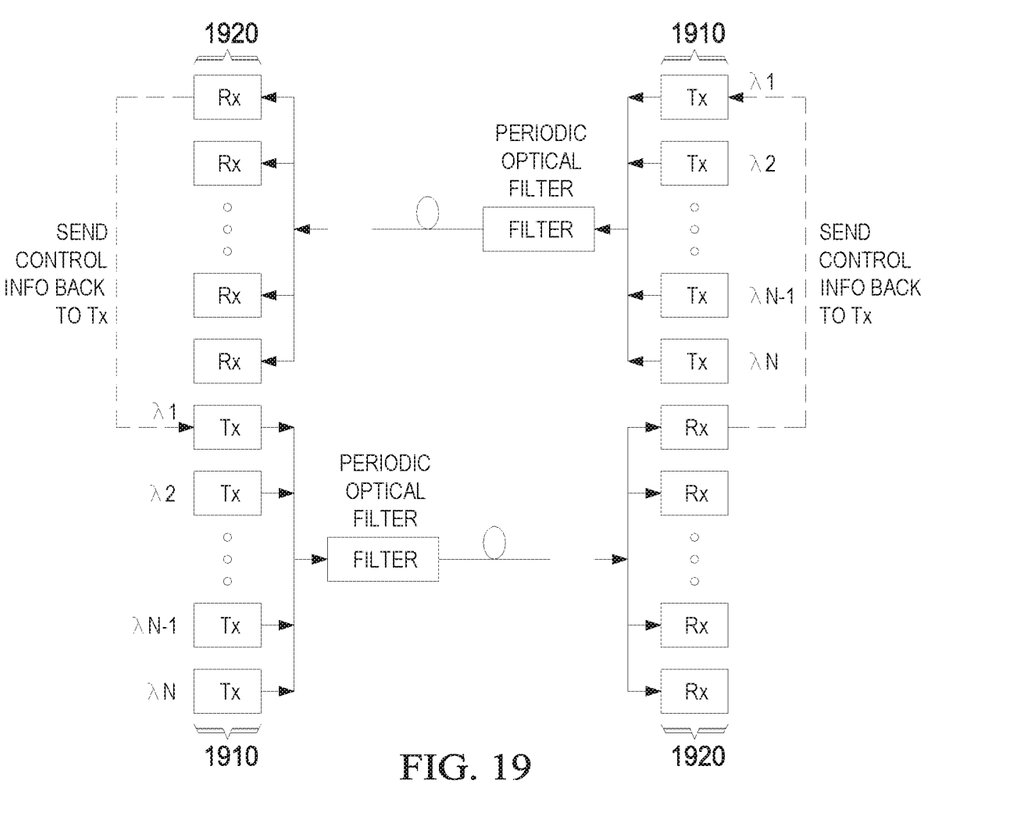
FIG. 19 is a schematic diagram of a transmission system involving wavelength control using a periodic optical filter.

FIG. 19 illustrates an alternative embodiment for wavelength control using a periodic optical filter, such as the periodic optical filter 1310 of FIG. 13 or the interleaver 1730 of FIG. 17. Each of a plurality of transmitters 1910 transmitting at different wavelengths scans its wavelength in a particular range. In the case of 100 GHz channel spacing, the scan might occur in a range roughly from −20 GHz to +20 GHz. A transmitter 1910 might transmit its scanning settings to one or more of a plurality of receivers 1920. The communication method between a transmitter 1910 and a receiver 1920 might be digital and might use existing overhead or might be analog, such as a pilot signal. When one of the receivers 1920 receives a transmission from one of the transmitters 1910, the receiver 1920 might send control information back to the transmitter 1910. The control information sent by the receiver 1920 might include the receiver's status, such as the BER and whether or not the receiver converges, as well as a scan setting of a transmission in the other direction. The control information might then be used for wavelength control. For example, when the BER in a signal is minimized, it can be assumed that the wavelength of that signal has been optimized.

Figure 20:
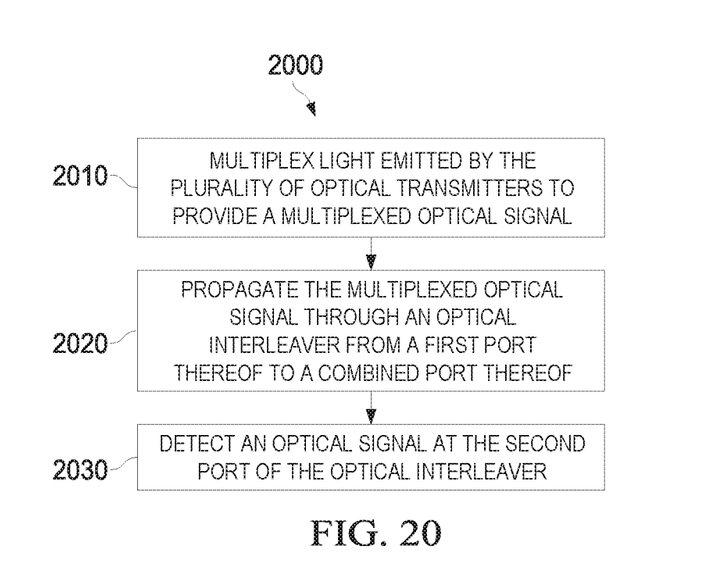
FIG. 20 is a flowchart illustrating an embodiment method for wavelength control.
Figure 21:
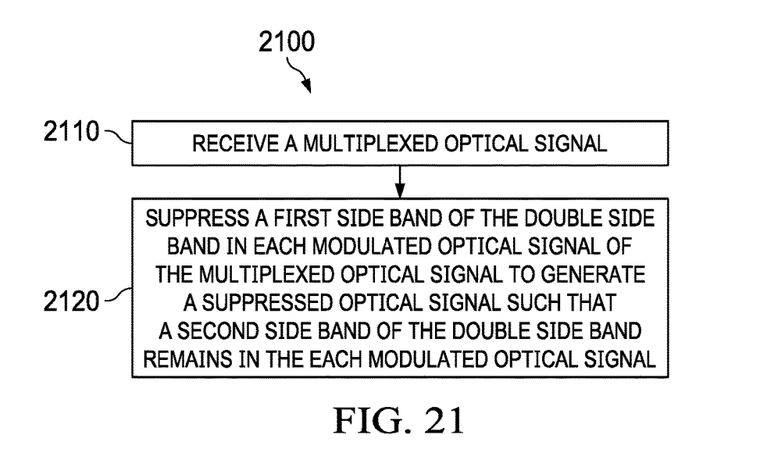
FIG. 21 is a flowchart illustrating an embodiment method performed by a periodic optical filter.

FIG. 20 is a flowchart illustrating an embodiment method 2000 for controlling emission wavelength of a plurality of optical transmitters. At block 2010, light emitted by the plurality of optical transmitters is multiplexed to provide a multiplexed optical signal. At block 2020, the multiplexed optical signal is propagated through an optical interleaver from a first port thereof to a combined port thereof and back to a second port thereof. At block 2030, an optical signal is detected at the second port of the optical interleaver. FIG. 21 is a flowchart illustrating an embodiment method performed by a periodic optical filter. At block 2110, the periodic optical filter may receive a multiplexed optical signal. The multiplexed optical signal may be generated by multiplexing a plurality of modulated optical signals transmitted by a plurality of transmitters. Each modulated optical signal of the plurality of modulated optical signals may have a different center wavelength and a double side band. At block 2120, the periodic optical filter may suppress a first side band of the double side band in the each modulated optical signal of the multiplexed optical signal to generate a suppressed optical signal such that a second side band of the double side band remains in the each modulated optical signal.

Figure 22:
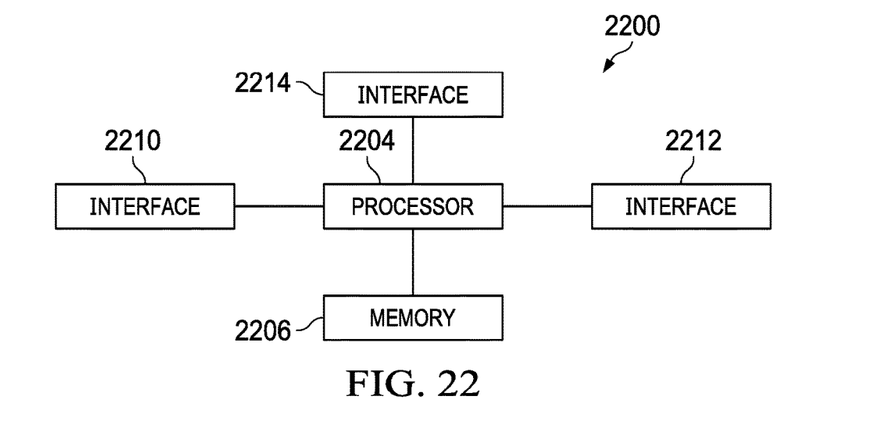
FIG. 22 is a block diagram illustrating an embodiment processing system for performing methods described herein.

FIG. 22 illustrates a block diagram of an embodiment processing system 22100 for performing methods described herein, which may be installed in a host device. As shown, the processing system 2200 includes a processor 2204, a memory 2206, and interfaces 2210-2214, which may (or may not) be arranged as shown in the figure. The processor 2204 may be any component or collection of components adapted to perform computations and/or other processing related tasks, and the memory 2206 may be any component or collection of components adapted to store programming and/or instructions for execution by the processor 2204. In an embodiment, the memory 2206 includes a non-transitory computer readable medium. The interfaces 2210, 2212, 2214 may be any component or collection of components that allow the processing system 2200 to communicate with other devices/components and/or a user. For example, one or more of the interfaces 2210, 2212, 2214 may be adapted to communicate data, control, or management messages from the processor 2204 to applications installed on the host device and/or a remote device. As another example, one or more of the interfaces 2210, 2212, 2214 may be adapted to allow a user or user device (e.g., personal computer (PC), etc.) to interact/communicate with the processing system 2200. The processing system 2200 may include additional components not depicted in the figure, such as long term storage (e.g., non-volatile memory, etc.).

In some embodiments, the processing system 2200 is included in a network device that is accessing, or part otherwise of, a telecommunications network. In one example, the processing system 2200 is in a network-side device in a wireless or wireline telecommunications network, such as a base station, a relay station, a scheduler, a controller, a gateway, a router, an applications server, or any other device in the telecommunications network. In other embodiments, the processing system 2200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 23:
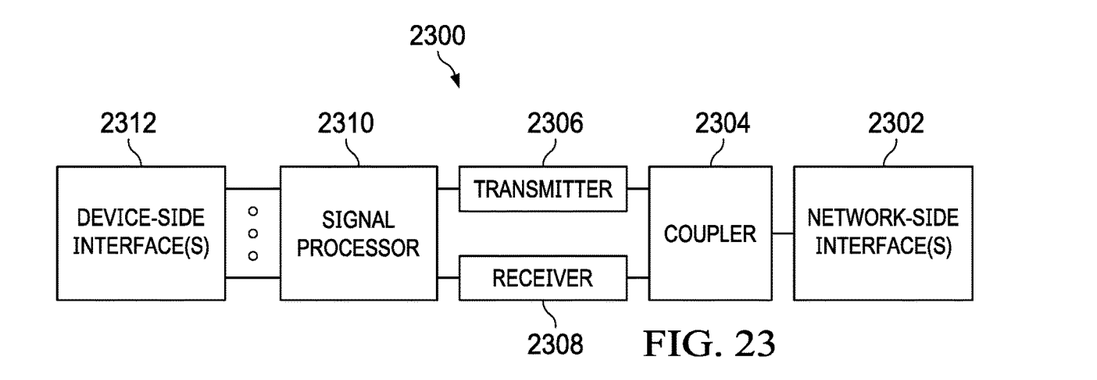
FIG. 23 is a block diagram illustrating a transceiver adapted to transmit and receive signaling over a telecommunications network.

In some embodiments, one or more of the interfaces 2210, 2212, 2214 connects the processing system 2200 to a transceiver adapted to transmit and receive signaling over the telecommunications network. FIG. 23 illustrates a block diagram of a transceiver 2300 adapted to transmit and receive signaling over a telecommunications network. The transceiver 2300 may be installed in a host device. As shown, the transceiver 2300 comprises a network-side interface 2302, a coupler 2304, a transmitter 2306, a receiver 2308, a signal processor 2310, and a device-side interface 2312. The network-side interface 2302 may include any component or collection of components adapted to transmit or receive signaling over a wireless or wireline telecommunications network. The coupler 2304 may include any component or collection of components adapted to facilitate bi-directional communication over the network-side interface 2302. The transmitter 2306 may include any component or collection of components (e.g., up-converter, power amplifier, etc.) adapted to convert a baseband signal into a modulated carrier signal suitable for transmission over the network-side interface 2302. The receiver 2308 may include any component or collection of components (e.g., down-converter, low noise amplifier, etc.) adapted to convert a carrier signal received over the network-side interface 2302 into a baseband signal. The signal processor 2310 may include any component or collection of components adapted to convert a baseband signal into a data signal suitable for communication over the device-side interface(s) 23112, or vice-versa. The device-side interface(s) 2312 may include any component or collection of components adapted to communicate data-signals between the signal processor 2310 and components within the host device (e.g., the processing system 2200, local area network (LAN) ports, etc.).

The transceiver 2300 may transmit and receive signaling over any type of communications medium. In some embodiments, the transceiver 2300 transmits and receives signaling over a wireless medium. For example, the transceiver 2300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2302 comprises one or more antenna/radiating elements. For example, the network-side interface 2302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. An optical transmitter module, comprising:
   a plurality of transmitters for transmitting a plurality of modulated optical signals, each modulated optical signal of the plurality of modulated optical signals having a different center wavelength and a double side band;
   a multiplexor operably coupled to the plurality of transmitters to multiplex the plurality of modulated optical signals into a multiplexed optical signal; and
   a periodic optical filter configured to:
   receive the multiplexed optical signal, and
   suppress a first side band of the double side band in the each modulated optical signal such that a second side band of the double side band remains in the each modulated optical signal of the multiplexed optical signal.

2. The optical transmitter module of claim 1, wherein the periodic optical filter comprises an optical interleaver.

3. The optical transmitter module of claim 2, wherein the optical interleaver comprises a first port, a second port, and a combined port, wherein the multiplexor is optically coupled to the first port, the optical transmitter module further comprising:
   a reflective element coupled to the combined port of the optical interleaver for reflecting a portion of the multiplexed optical signal from the combined port back to the second port; and
   a photodetector coupled to the second port of the optical interleaver for detecting the portion of the multiplexed optical signal reflected from the combined port back to the second port.

4. The optical transmitter module of claim 3, wherein each transmitter of the plurality of transmitters is configured to modulate the each modulated optical signal with a corresponding pilot tone, the plurality of transmitters coupled to a controller, and the controller comprising a pilot tone detector for detecting the corresponding pilot tone in the each modulated optical signal.

5. The optical transmitter module of claim 4, wherein the controller is configured to:
   measure a strength of the corresponding pilot tone; and
   adjust the center wavelength of the each modulated optical signal to increase the strength of the corresponding pilot tone.

6. The optical transmitter module of claim 1, wherein a central frequency of the periodic optical filter and a central frequency of the each modulated optical signal are offset by one half of a channel spacing.

7. The optical transmitter module of claim 1, wherein the periodic optical filter comprises at least one of a Fabry-Perot etalon, a multi-cavity etalon, or a Mach-Zehnder interferometer.

8. The optical transmitter module of claim 1, wherein the periodic optical filter suppresses the first side band of the double side band in a first modulated optical signal of the plurality of modulated optical signals concurrently with suppressing the first side band of the double side band in a second modulated optical signal of the plurality of modulated optical signals.

9. A method comprising:
   transmitting, by a plurality of transmitters of an optical transmitter module, a plurality of modulated optical signals, each modulated optical signal of the plurality of modulated optical signals having a different center wavelength and a double side band;
   multiplexing, by a multiplexor of the optical transmitter module, the plurality of modulated optical signals into a multiplexed optical signal;
   receiving, by a periodic optical filter of the optical transmitter module, the multiplexed optical signal; and
   suppressing, by the periodic optical filter, a first side band of the double side band in the each modulated optical signal such that a second side band of the double side band remains in the each modulated optical signal of the multiplexed optical signal.

10. The method of claim 9, wherein the periodic optical filter comprises an optical interleaver.

11. The method of claim 10, wherein the optical interleaver comprises a first port, a second port, and a combined port, wherein the multiplexor is optically coupled to the first port, the method further comprising:
    reflecting, by a reflective element coupled to the combined port of the optical interleaver, a portion of the multiplexed optical signal from the combined port back to the second port; and
    detecting, by a photodetector coupled to the second port of the optical interleaver, the portion of the multiplexed optical signal reflected from the combined port back to the second port.

12. The method of claim 11, wherein each transmitter of the plurality of transmitters is configured to modulate the each modulated optical signal with a corresponding pilot tone, the plurality of transmitters coupled to a controller, and the controller comprising a pilot tone detector for detecting the corresponding pilot tone in the each modulated optical signal.

13. The method of claim 12, further comprising:
measuring, by the controller, a strength of the corresponding pilot tone; and
adjusting, by the controller, the center wavelength of the each modulated optical signal to increase the strength of the corresponding pilot tone.

14. The method of claim 9, wherein a central frequency of the periodic optical filter and a central frequency of the each modulated optical signal are offset by one half of a channel spacing.

15. The method of claim 9, wherein the periodic optical filter comprises at least one of a Fabry-Perot etalon, a multi-cavity etalon, or a Mach-Zehnder interferometer.

16. The method of claim 9, wherein the periodic optical filter suppresses the first side band of the double side band in a first modulated optical signal of the plurality of modulated optical signals concurrently with suppressing the first side band of the double side band in a second modulated optical signal of the plurality of modulated optical signals.

17. An optical transmitter module, comprising:
a first transmitter for transmitting a first modulated optical signal, the first modulated optical signal having a first center wavelength and a first double side band;
a second transmitter for transmitting a second modulated optical signal, the first modulated optical signal having a second center wavelength different from the first center wavelength and a second double side band different from the first double side band;
a multiplexor configured to multiplex at least the first modulated optical signal and the second modulated optical signal into a multiplexed optical signal; and
a periodic optical filter configured to:
suppress a first side band of the first double side band in the first modulated optical signal such that a second side band of the first double side band remains in the first modulated optical signal of the multiplexed optical signal, wherein a central frequency of the periodic optical filter and a central frequency of the first modulated optical signal are offset by one half of a channel spacing.

18. The optical transmitter module of claim 17, wherein the periodic optical filter comprises an optical interleaver.

19. The optical transmitter module of claim 18, wherein the optical interleaver comprises a first port, a second port, and a combined port, wherein the multiplexor is optically coupled to the first port, the optical transmitter module further comprising:
a reflective element coupled to the combined port of the optical interleaver for reflecting a portion of the multiplexed optical signal from the combined port back to the second port; and
a photodetector coupled to the second port of the optical interleaver for detecting the portion of the multiplexed optical signal reflected from the combined port back to the second port.

20. The optical transmitter module of claim 19, wherein the first transmitter is configured to modulate the first modulated optical signal with a corresponding pilot tone, the first transmitter coupled to a controller, and the controller comprising a pilot tone detector for detecting the corresponding pilot tone in the first modulated optical signal.

* * * * *